United States Patent
Fu et al.

(10) Patent No.: US 9,609,338 B2
(45) Date of Patent: Mar. 28, 2017

(54) LAYERED VIDEO ENCODING AND DECODING

(71) Applicant: Microsoft Technology Licensing, LLC, Redmond, WA (US)

(72) Inventors: Jingjing Fu, Beijing (CN); Yan Lu, Beijing (CN); Shipeng Li, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 434 days.

(21) Appl. No.: 14/063,476

(22) Filed: Oct. 25, 2013

(65) Prior Publication Data
US 2015/0117545 A1 Apr. 30, 2015

(51) Int. Cl.
| | |
|---|---|
| *H04N 19/60* | (2014.01) |
| *H04N 19/30* | (2014.01) |
| *H04N 19/172* | (2014.01) |
| *H04N 19/103* | (2014.01) |
| *H04N 19/137* | (2014.01) |
| *H04N 19/174* | (2014.01) |
| *H04N 19/187* | (2014.01) |

(52) U.S. Cl.
CPC .......... *H04N 19/30* (2014.11); *H04N 19/103* (2014.11); *H04N 19/137* (2014.11); *H04N 19/172* (2014.11); *H04N 19/174* (2014.11); *H04N 19/187* (2014.11); *H04N 19/60* (2014.11)

(58) Field of Classification Search
None
See application file for complete search history.

(56) References Cited

U.S. PATENT DOCUMENTS

| | | | |
|---|---|---|---|
| 3,277,462 | A | 10/1966 | Sekimoto |
| 6,111,596 | A | 8/2000 | Haskell et al. |
| 6,263,022 | B1 | 7/2001 | Chen et al. |
| 6,614,936 | B1 | 9/2003 | Wu et al. |
| 6,788,740 | B1 | 9/2004 | van der Schaar et al. |
| 7,376,278 | B2 | 5/2008 | Iwamura |
| 8,270,473 | B2 | 9/2012 | Chen et al. |
| 8,340,177 | B2 | 12/2012 | Ji et al. |

(Continued)

OTHER PUBLICATIONS

Office action for U.S. Appl. No. 14/063,585 mailed on Nov. 18, 2015, Fu et al., "Layered Encoding Using Spatial and Temporal Analysis", 17 pages.

(Continued)

*Primary Examiner* — Cai Chen
(74) *Attorney, Agent, or Firm* — Lee & Hayes, PLLC (57) ABSTRACT

In some examples, a layered encoding component and a layered decoding component provide for different ways to encode and decode, respectively, video streams transmitted between devices. For instance, in encoding a video stream, a layered encoding component may analyze the content of successive video frames and determine different types of encoding techniques to use for different ones of the video frames. Further, in some cases, some of the encoding techniques may be used on less than an entire video frame. In another example, in decoding a video stream, a layered decoding component may receive video frames encoded with different types of encoding. The layered decoding component may decode the differently encoded video frames and combine them to reconstruct a video stream.

20 Claims, 9 Drawing Sheets

(56) References Cited

U.S. PATENT DOCUMENTS

| | | | |
|---|---|---|---|
| 8,416,848 | B2 | 4/2013 | Gordon et al. |
| 2002/0150158 | A1 | 10/2002 | Wu et al. |
| 2003/0174769 | A1* | 9/2003 | Nagumo .............. H04N 19/105 |
| | | | 375/240.02 |
| 2004/0264568 | A1 | 12/2004 | Florencio |
| 2005/0152452 | A1* | 7/2005 | Suzuki ................ H04N 19/176 |
| | | | 375/240.16 |
| 2007/0074266 | A1 | 3/2007 | Raveendran et al. |
| 2007/0086528 | A1 | 4/2007 | Mauchly et al. |
| 2007/0160128 | A1 | 7/2007 | Tian et al. |
| 2007/0201751 | A1* | 8/2007 | Wu .................... G06K 9/00456 |
| | | | 382/232 |
| 2008/0151101 | A1 | 6/2008 | Tian et al. |
| 2011/0194616 | A1 | 8/2011 | He et al. |
| 2012/0082215 | A1 | 4/2012 | Sze et al. |
| 2013/0101014 | A1* | 4/2013 | Fu ......................... H04N 19/12 |
| | | | 375/240.1 |
| 2014/0254928 | A1 | 9/2014 | Tsai et al. |
| 2015/0117515 | A1 | 4/2015 | Fu et al. |

OTHER PUBLICATIONS

Office action for U.S. Appl. No. 14/063,585, mailed on Mar. 29, 2016, Fu et al., "Layered Encoding Using Spatial and Temporal Analysis", 19 pages.

Baratto, et al., "THINC: A Remote Display Architecture for Thin-Client Computing", In Technical Report, CUCS-027-04, Jul. 2004, 15 pages.

Benzler, Ulrich, "Scalable Multi-Resolution Video Coding Using a Combined Subband-DCT Approach", In Proceedings of Picture Coding Symposium, Apr. 21, 1999, 4 pages.

Lu, et al., "Virtualized Screen: A Third Element for Cloud Mobile Convergence", In Journal of IEEE MultiMedia, vol. 18, Issue 2, Feb. 2011, 8 pages.

Pan, et al., "A Low-Complexity Screen Compression Scheme for Interactive Screen Sharing", In IEEE Transactions on Circuits and Systems for Video Technology, vol. 23, Issue 6, Jun. 2013, 12 pages.

Pawate, et al., "Remote Display Technology Enhances the Cloud's User Experience", In White Paper of Texas Instruments, Aug. 2012, 13 pages.

"RemoteFX Adaptive Graphics in Windows Server 2012 and Windows 8", Published on: Aug. 6, 2012, Available at: http://blogs.msdn.com/b/rds/archive/2012/08/06/remotefx-adaptive-graphics-in-windows-server-2012-and-windows-8.aspx?Redirected=true, 5 pages.

Shen, et al., "A High-Performance Remote Computing Platform", In IEEE International Conference on Pervasive Computing and Communication, Mar. 9, 2009, 6 pages.

Wang, et al., "Content-Aware Layered Compound Video Compression", In IEEE International Symposium on Circuits and Systems, May 20, 2012, 4 pages.

Yao, et al., "Scalable Video Coding in a Nutshell", Retrieved on: Jun. 13, 2013, Available at: http://www.itsc.org.sg/pdf/synthesis08/Four_SVC.pdf, 20 pages.

\* cited by examiner

LAYERED VIDEO ENCODING AND DECODING

BACKGROUND

Remote computing often involves the remote use of a display and the transfer of data to allow a remote display to be displayed locally. Other computing environments also require the transfer of visual data, for example video streaming, gaming, remote desktops, and remote video conferencing, among others. To address solutions for transferring visual information from which an image may be rendered, several compression techniques and video codecs have been developed and standardized. However, traditionally, video codecs apply to entire frames of a video stream and are unable to provide smooth user experiences at high frame rates.

SUMMARY

The techniques and systems described herein present various implementations of layered screen video coding and decoding. For example, in one implementation applied to the transmission of a video stream, video screen frames may be analyzed to determine an amount by which consecutive video frames differ from each other. In this example, based at least in part on the analysis of the video frames, some video frames may be encoded with a first or base layer encoding, and portions of other video frames may be encoded using a second layer encoding. Further, both the base layer encoded video frames and the second layer encoded video frames may be transmitted, decoded, and combined at a destination device into a reconstructed video stream.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The techniques and systems described herein are directed to various implementations of a layered encoding component and a layered decoding component. The layered encoding component, or simply encoding component, provides a variety of ways for encoding a stream of image data for efficient and compact transmissions from a source device to a destination device. For example, for a video stream, a layered encoding may provide frame rates high enough to provide smooth and responsive user experiences when using remote displays. The layered decoding component, or simply decoding component, works to decode image data encoded with the layered encoding component. For example, the layered decoding component may receive different encoded layers of a video stream transmitted from a source device and decode the differently encoded layers to generate a reconstructed video stream for display on a target device.

In one example, a user at a local computer may interact with a remote computer. In this example of remote usage, the remote computer may be licensed to execute a drawing program and the user at the local computer may perform actions such as draw an object. In order for the user to see any updates of the drawing actions, a video stream that includes the user interface of the drawing program on the remote computer would be encoded and transmitted from the remote computer to the local computer. In this environment, the layered encoding component on the remote computer and the layered decoding component on the local computer may provide the user with the ability to see the remote user interface on their local computer such that the local display of the remote user interface appears smooth, immediately responsive, and with no interruptions in the video stream for downloading or processing.

In other examples, the layered encoding component and layered decoding component may be used in different computing environments such as video streaming media content, screen sharing, web or video conferencing, online training. In general, the layered encoding component and layered decoding component may be implemented in any computing environment where a series of image frames are transmitted from one computing device to another computing device.

Example Implementations

Figure 1:
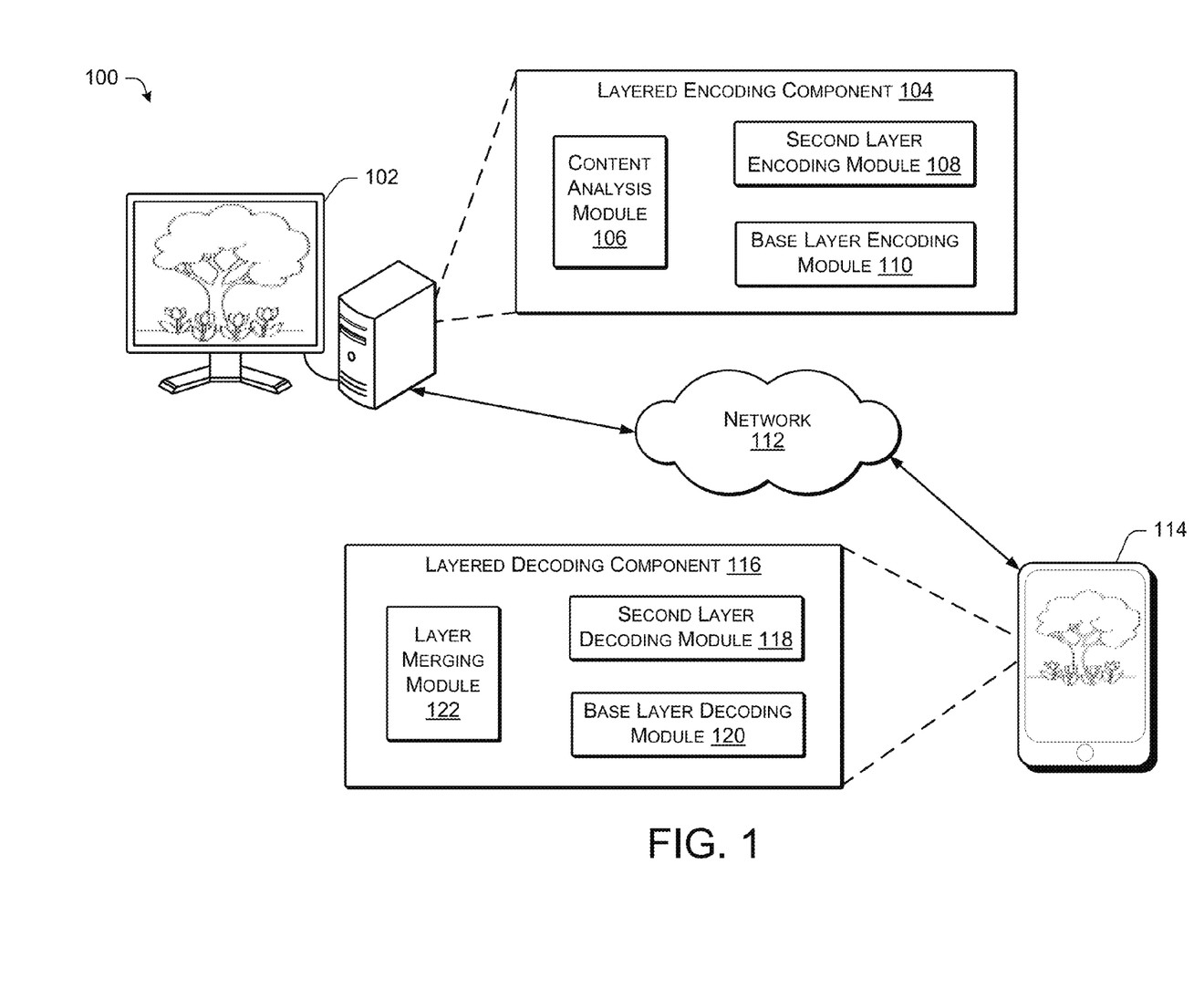
FIG. 1 illustrates an example overview of a computing environment in which a layered encoding component and layered decoding component may be implemented.

FIG. 1 illustrates an overview of a computing environment 100 in which the layered encoding component and layered decoding component may be implemented. In this example environment, computing device 102 includes a display that is displaying an image. The image currently displayed may be one frame of a video stream. In other examples, the image or video stream on a source computer such as computing device 102 may simply be generated without being displayed locally. In other words, in some cases, computing device 102 may simply provide the image or video stream for transmission. Further, computing device 102 may simultaneously provide multiple remote devices with either the same video stream transmission or distinct video stream transmissions.

Further, in this implementation, computing device 102 includes layered encoding component 104, which may include modules such as content analysis module 106, second layer encoding module 108, and base layer encoding module 110. Content analysis module 106 may analyze video frames or image data from a sequence of video frames to determine which video frames are suitable for encoding using a second layer encoding, and which video frames are suitable for encoding using a base layer encoding. Based at least in part on the analysis from content analysis module 106, a video frame may be provided to second layer encoding module 108 or to base layer encoding module 110. After a video frame is encoded using the appropriate encoding module, the encoded video frame may be transmitted across a network, such as network 112. In some implementations, the base layer encoding and second layer encoding may be performed in parallel. Further, in other implementations, the content analysis may also be performed in parallel.

In general, layered encoding component 104 may include multiple encoding modules, where each respective encoding module may be configured to implement a particular encoding technique based on corresponding image characteristics. In other words, the base layer, or first layer, and second layer encoding modules are one implementation, and different and/or additional encoding modules may be used within layered encoding component 104 and different and/or additional and corresponding decoding modules may be used within layered decoding component 116.

Computing device 114 may receive the encoded video frames transmitted from computing device 102. In other examples, computing device 114 may be one of several computing devices receiving encoded video frames transmitted from computing device 102. In this implementation, layered decoding component 116 may process received video frames to reconstruct the video stream being transmitted. For example, layered decoding component 116 may include layer merging module 122, second layer decoding module 118, and base layer decoding module 120. In some implementations, layer merging module 122 performs no analysis of received video frames. Instead, layer merging module 122 may directly distribute a received bit stream to an appropriate decoder. For example, layer merging module 122 may, depending on packet header information within a received transmission of an encoded video frame, distribute an encoded video frame to either base layer decoding module 120 or distribute the encoded video frame to second layer decoding module 118. The layer merging module 122 may then use the decoded video frame, along with subsequently received and decoded video frames, to create a sequence of video frames in order to reconstruct the video stream transmission. Further, the decoded video frames may have arrived in an arbitrary order, in which case, in some implementations, metadata may be included within the encoded video frames to determine an order in which to arrange the decoded video frames to reconstruct the original video stream transmission. For example, the metadata may specify a position of a given video frame within the overall video stream, or specify a relative position of a given video frame with regard to another video frame.

Further, in some cases, the metadata may include a flag or some other indicator that specifies that another given video frame or video frames are to be skipped based on the given video frame or video frames not differing enough from a previous video frame. The metadata indicating that a video frame may be skipped may be included within a base layer encoded video frame or a second layer encoded video frame. For example, in the case that the frame being skipped is a second layer encoded video frame, the metadata may specify that a reference frame, such as the previous second layer frame is to be copied to generate the skipped second layer video frame. Similarly, in the case that the frame being skipped is a base layer encoded video frame, the metadata may specify that a reference frame, such as the previous base layer frame is to be copied to generate the skipped base layer video frame. In other cases, instead of metadata specifying a skip frame, a transmission may include, instead of encoded video frame data, a flag or indicating that the received transmission corresponds to a skipped frame in addition to an indication of another video frame to copy in place of the skipped frame.

In some implementations, layered encoding component 104 and layered decoding component 116 may be implemented within a single module or component, and in this way, the encoding and decoding functionality may serve to both encode and decode video streams. Further, for some video streams, it may be that none of the video frames are determined to be suitable for anything but a single layer encoding, and in implementations that use more than two types of encodings, it may be that only some but not all of the different types of encodings are used in encoding the frames of a video stream.

Figure 2:
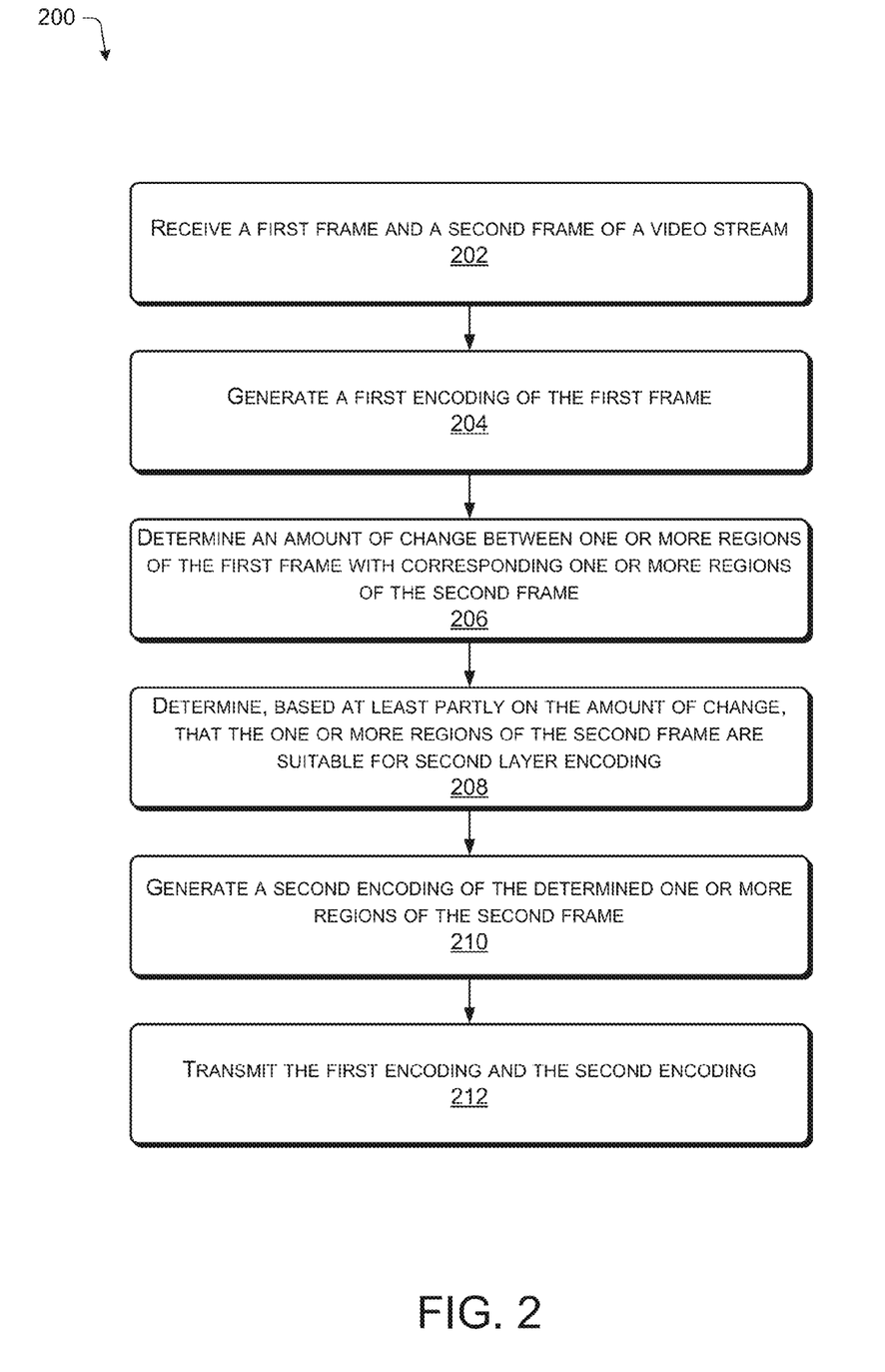
FIG. 2 illustrates a flowchart depicting a method to encode a series of video frames into multiple layers according to some implementations.

FIG. 2 depicts an example flowchart 200 that includes some of the computational operations within an implementation of a layered encoding component, as it may operate within computing environment 100. Some of the blocks represent operations that can be implemented in hardware, software, or a combination thereof. In the context of software, the blocks represent computer-executable instructions stored on one or more computer-readable media that, when executed by one or more processors, perform the recited operations.

In this implementation, a layered encoding component, such as layered encoding component 104, may receive a series of video frames for a video stream, including first and second frames, as depicted at 202. The first and second frames may be any of the frames of the video stream. In some cases, the first video frame may be base layer encoded and the second video frame may be second layer encoded. In other cases, the first and second video frames may be base layer encoded. In still other cases, the first video frame may be second layer encoded and the second video frame may be base layer encoded. In still other cases, both the first and second video frames may be base layer encoded. In this example, the first video frame may be base layer encoded and the layered encoding component may generate the first encoding in response to receiving the first video frame, as depicted at 204.

In some implementations, differences between image information between frames may be determined based on a variety of image comparison techniques. Further, the regions determined to include the differences may be further analyzed to determine whether or not the differences exceed a given threshold. In some example, if the differences between corresponding regions between video frames exceed the given threshold, the content analysis module 106 may determine whether or not to encode the video frame according to either a second layer encoding or a base layer encoding. In some examples, for purposes of relative designation, a base layer encoding or base layer may also be referred to as a first layer encoding or a first layer.

In different implementations, a video frame may be divided into regions in different ways. For example, a video frame may be divided into groups of pixels of any shape. Further, video frames may be of any arbitrary dimension, and the division into regions of the video frames may result in different sized regions for different sized video frames. In some cases, if a video frame is 640×480 pixels, the regions may be blocks of 10×10 pixels, or blocks of 16×16 pixels, or blocks of some other dimension.

Further, in some implementations, the differences may be based on a number of pixels that are different, based on color distances between pixels, or based on some other measure of distinction between data values representing pixel data or group of pixels. In some implementations, the threshold value may be user configured or the threshold value may be defined within the layered encoding component 104 prior to use. In this example, the layered encoding component may determine, according to any of the above examples for comparing frame regions, an amount of change between one or more regions of the first frame with corresponding one or more regions of the second frame, as depicted at 206.

In this example, after the content analysis module 106 determines an amount of change between corresponding regions of the first and second frames is greater than a given threshold, the content analysis module 106 may determine, based at least partly on the amount of change, that one or more regions of the second frame is suitable for an encoding for a second layer, as depicted at 208. Given that in most cases a small portion of the second video frame may be determined to differ enough from a previous video frame to be second layer encoded, high frame rate encoding may be supported. For example, since only a small portion of the second video frame is encoded in the second layer, the coding complexity is greatly reduced and the encoding frame rate is increased. With respect to layered encoding component 104, the first encoding may be a base layer encoding performed with base layer encoding module 110, and the second encoding may be a second layer encoding performed with second layer encoding module 108. In general, the layered encoding component may determine an appropriate encoding layer for the first and second frames. With respect to the entire video stream, in a typical example, the very first video frame of the video stream may be encoded with a base layer encoding. However, in this example, for the purposes of depicting a general case, the first and second frames may be considered to be any two video frames of the video stream.

In some implementations, the regions determined to satisfy the threshold quantity of difference between frames are encoded with the second layer encoding. Further, in some implementations, the remaining regions, or the regions determined not to satisfy the threshold quantity of difference between frames are not encoded at all. For example, if a single region is determined to be encoded with the second layer encoding, no other region of the video frame would be encoded. Further, in some implementations, the second layer encoding technique may be an industry standard codec, and the improvement in processing efficiency may come from encoding some but not all of the regions of a video frame. In other implementations, the second layer encoding may be object-level encoded and may be based on different encoding techniques.

Given that less than all regions of a video frame may be encoded with the second layer encoding, a transmission of the video frame may also include metadata indicating which region or regions have been encoded. In this example, the region or regions that have been encoded with the second layer encoding are combined with regions from other surrounding video frames in order to generate a full video frame will all regions defined. In some cases, the metadata may further specify which other frames to be used as the basis for generating a full video frame from the region or regions encoded with the second layer encoding. The metadata may also specify the size and/or location of the region or regions of the video frame encoded with the first layer encoding.

In this example, after the one or more regions of the second frame have been determined to be suitable for second layer encoding, the second frame may then be encoded using a second encoding, as depicted at 210. Further, in some cases, the base layer encoding may be an industry standard codec, for example, MPEG-2, or H.264, or some other type of encoding.

Further, in this example, the layered encoding component may transmit the first encoding and the second encoding to a destination device, as depicted at 212.

Figure 3:
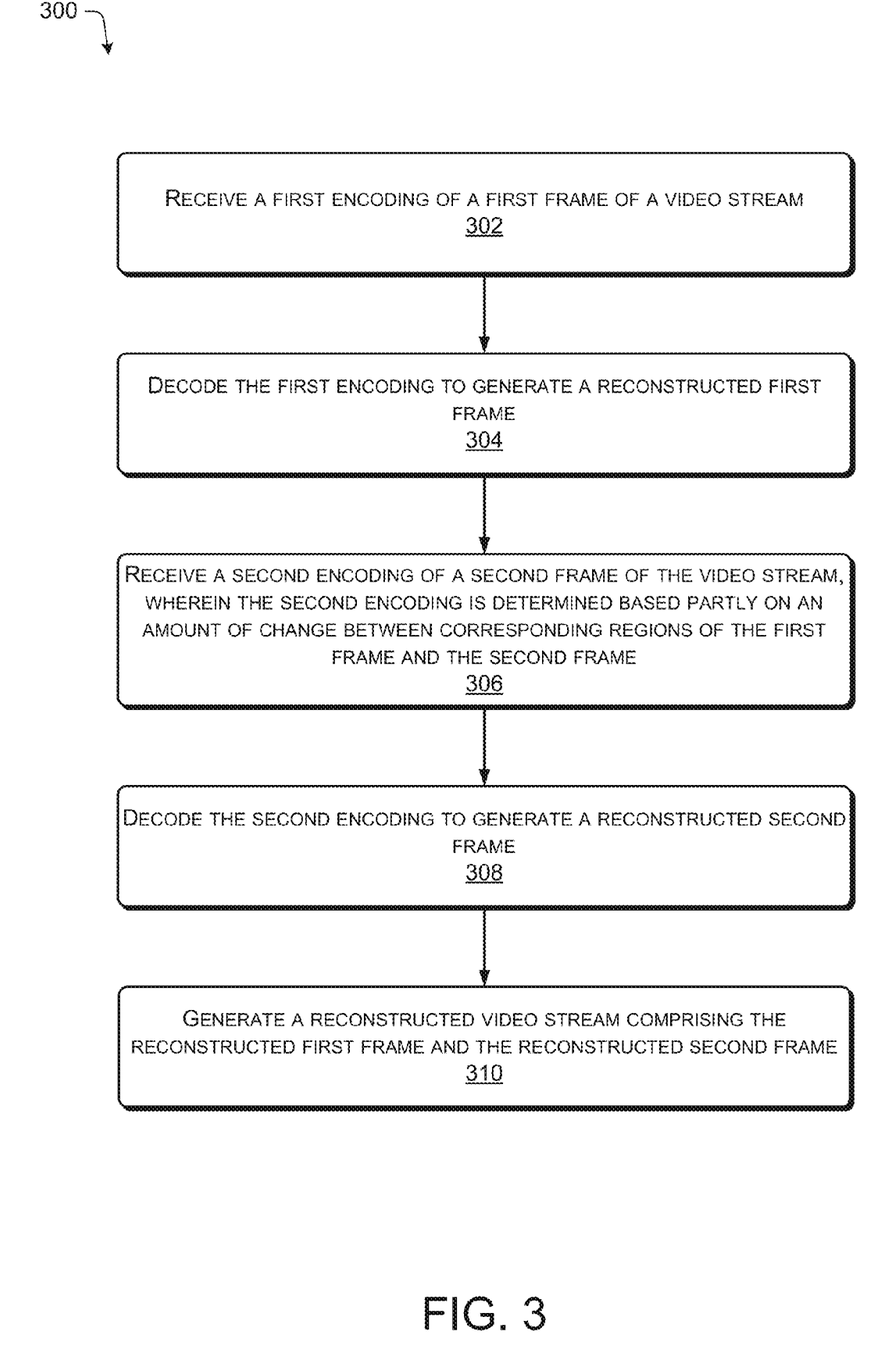
FIG. 3 illustrates a flowchart depicting a method to decode, into a video stream, a series of video frames that have been encoded into multiple layers, according to some implementations.

FIG. 3 depicts an example flowchart 300 that includes some of the computational operations within an implementation of a layered decoding component, as it may operate within computing environment 100. Some of the blocks represent operations that can be implemented in hardware, software, or a combination thereof. In the context of software, the blocks represent computer-executable instructions stored on one or more computer-readable media that, when executed by one or more processors, perform the recited operations.

As noted above in regard to FIG. 1, a device may be the recipient of a video stream transmitted from a remote device, such as recipient device 114. In this example, device 114 includes a layered decoding component, which may receive multiple encoded frames as part of the video stream, including receiving a transmission of a first encoding of a first frame, as depicted at 302. In some cases, encoded video frames may be received in an arbitrary order or out of order, and a correct order may determine when the video stream is reconstructed. Further, the layered decoding component may begin decoding a frame when it arrives, independently of receiving other video frames. For example, a given video frame may be encoded with a first layer or base layer encoding with no dependency on any other video frame, and therefore the given video frame may be completely decoded without regard to another video frame. However, in other cases, a given video frame encoding may depend on or reference another video frame, and in such a case the layered decoding component may delay a decoding of the given frame until the reference video frame is received. In this example, the layered decoding component may, after receiving the first encoding, decode the first encoding of the first video frame to generate a reconstructed video frame, as depicted at 304.

The layered encoding component may also receive a transmission of a second encoding of a second frame of the video stream, as depicted at 306. Further, the second encoding, as discussed above in regard to flowchart 200, may be determined based partly on an amount of change between corresponding regions of the first frame and the second frame. In other words, in some cases, decoding the second encoding may be based at least partly on a decoding of the first encoding.

Given the second encoding, the layered decoding component may then decode the second encoding to generate a reconstructed second frame, as depicted at 308. As discussed above, encoded transmissions may include metadata specifying a type of encoding used, and in the case of a second layer encoding, the metadata may further specify the location and dimensions of a region or regions and information to identify a frame against to be used as a basis for generating a full frame.

After the first and second frames have been decoded and reconstructed from the received encoded frames, the layered encoding component, or more specifically in this example, the layer merging module 122, may reconstruct a video stream that includes the decoded first and second frames, as depicted at 310. The layered encoding component may repeat this process for each received encoded frame, and in this way, the layered encoding component may reconstruct a video stream as it was transmitted from a source device.

Further, because the second and higher layer encodings usually encode less than all, and often only small regions, of a full video frame, the frame rate at which a video stream may be transmitted may be very high and still provide a user with a smoothly displayed video stream without any interruptions due to encoding and decoding the video stream. In some examples, a frame rate may be variable and reach 60 frames per second, or more while providing a non-interrupted video stream display.

Figure 4:
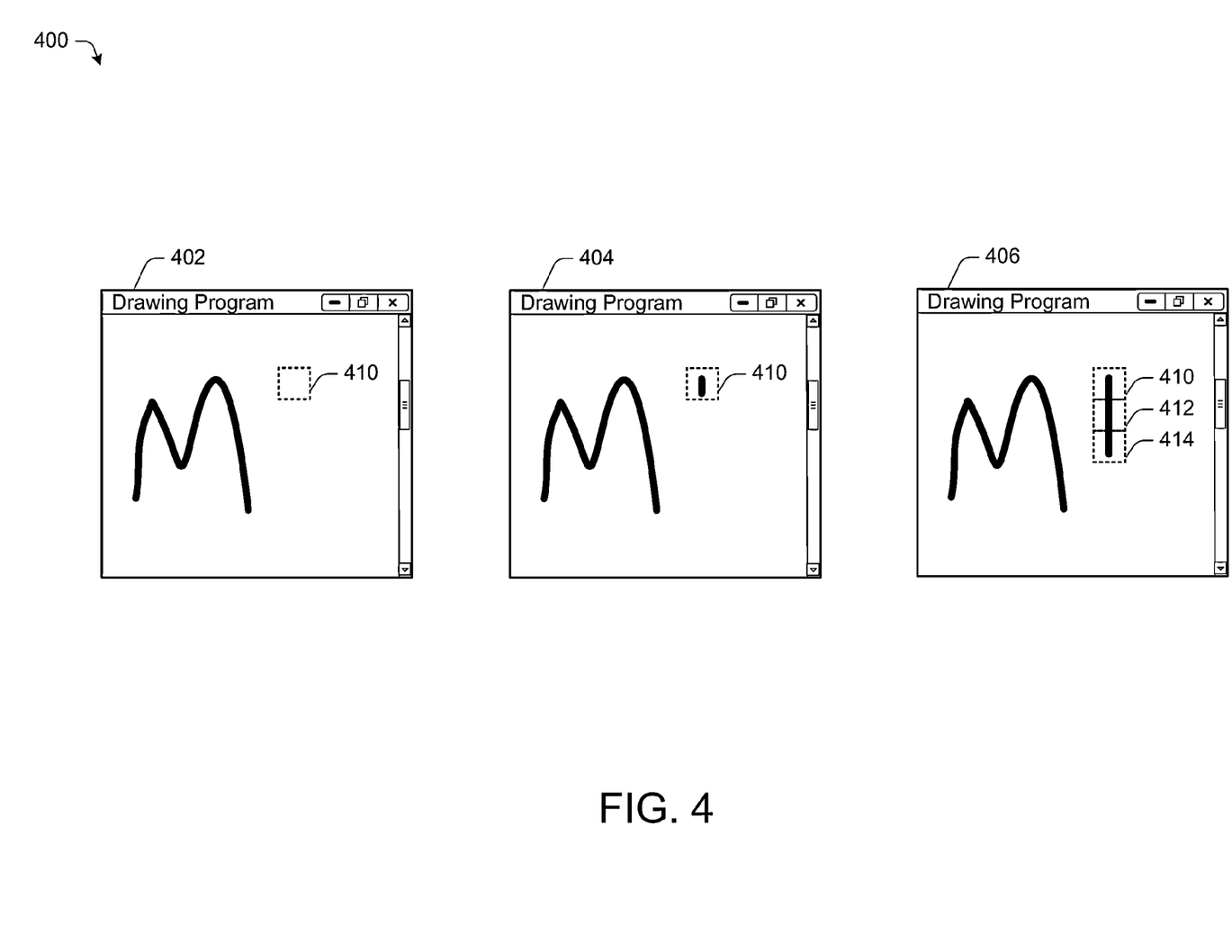
FIG. 4 depicts a series of user interface changes to illustrate operations performed in analyzing and encoding a video frames corresponding to user interface video frames in accordance with some implementations.

FIG. 4 illustrates a framework 400 depicting a sequence of four video frames that may be encoded and transmitted by the layered encoding component. Video frames 402, 404 and 406 are generated sequentially and represent the drawing program operation of drawing a vertical line.

Video frame 402 depicts a video frame immediately prior to a user drawing a vertical line, and video frame 404 depicts a video frame that includes the beginning of a drawn line. As discussed above in regard to FIG. 2, the layered encoding component may compare video frames against each other to determine whether or not an amount of change between a corresponding region or regions satisfies a threshold for determining that a video frame is suitable for a second layer encoding or whether the video frame is suitable for a base layer encoding.

In this example, assume that video frame 402 has already been determined to be a base layer video frame and to be correspondingly encoded with a base layer encoding, which may encode the entire contents, or all regions of the video frame. Further, in this example, after processing video frame 402, the layered encoding component may analyze video frame 404 and compare video frame 404 to video frame 402. In this comparison, the layered encoding component may determine that the amount of change between region 410 in video frame 402 and region 412 in video frame 404 is sufficient while at the same time the changes, or lack of changes between the remaining regions are small enough, or negligible enough, that video frame 404 is suitable for second layer encoding. In other words, in this example, because there was only change, or sufficient change, in a sufficiently small number of regions, while the remaining regions remained unchanged, or sufficiently unchanged, then the video frame is considered a suitable candidate for second layer encoding because the regions needed to encode the frame are small or beneath a threshold amount. In some cases, the threshold amount may be some percentage of regions of the video frame or some quantity of regions, for example, if less than 20% of the regions of the video frame have changes as compared to a reference video frame, then the video frame is determined to be suitable for second layer encoding, otherwise, the video frame may be determined to be suitable for base layer encoding. In different implementations, different thresholds may be set.

Further in this example, video frame 404, encoded with a second layer encoding, may also include metadata specifying the location and dimensions of the region or regions that have been encoded. In addition, the metadata may specify a reference video frame, which in this example would be video frame 402, to serve as a basis for reconstruction an entire video frame. In other words, on the receiving end of the encoded video stream of frames 402 and 404, the layered decoding component would decode video frame 402 with a base layer decoding algorithm, and decode video frame 404 with a second layer decoding algorithm. In this example, in decoding video frame 404 with the second layer decoding algorithm, the layered decoding component would use the region or regions not encoded in video frame 404 to determine a corresponding region or regions in video frame 402 in reconstructing an entire video frame. In other words, in this example, in reconstructing video frame 404, the layered decoding component would copy all regions of video frame 402 except for region 410, and create an entire video frame 404 from the copied regions of video frame 402 in combination with region 410 of video frame 404, where region 410 would have been derived from decoding the second layer encoded transmission.

Similarly, in this example, the layered encoding component, in comparing video frame 406 with video frame 404, may determine that video frame 406 is also suitable for second layer encoding based at least in part on the amount of change between corresponding regions of video frames 404 and 406. Further, in generating a second layer encoding of video frame 406, regions 410, 412 and 414 of video frame 406 would serve as the basis for the second layer encoding, and metadata within the transmission of the second layer encoding would also specify that video frame 402 would serve as the video frame for reconstructing the entire video frame 406. However, in other implementations, the reference video frame from which a second layer encoded video frame region or regions may be a previous encoded second layer encoding instead of a previously encoded base layer encoding, as discussed below in FIG. 5.

Figure 5:
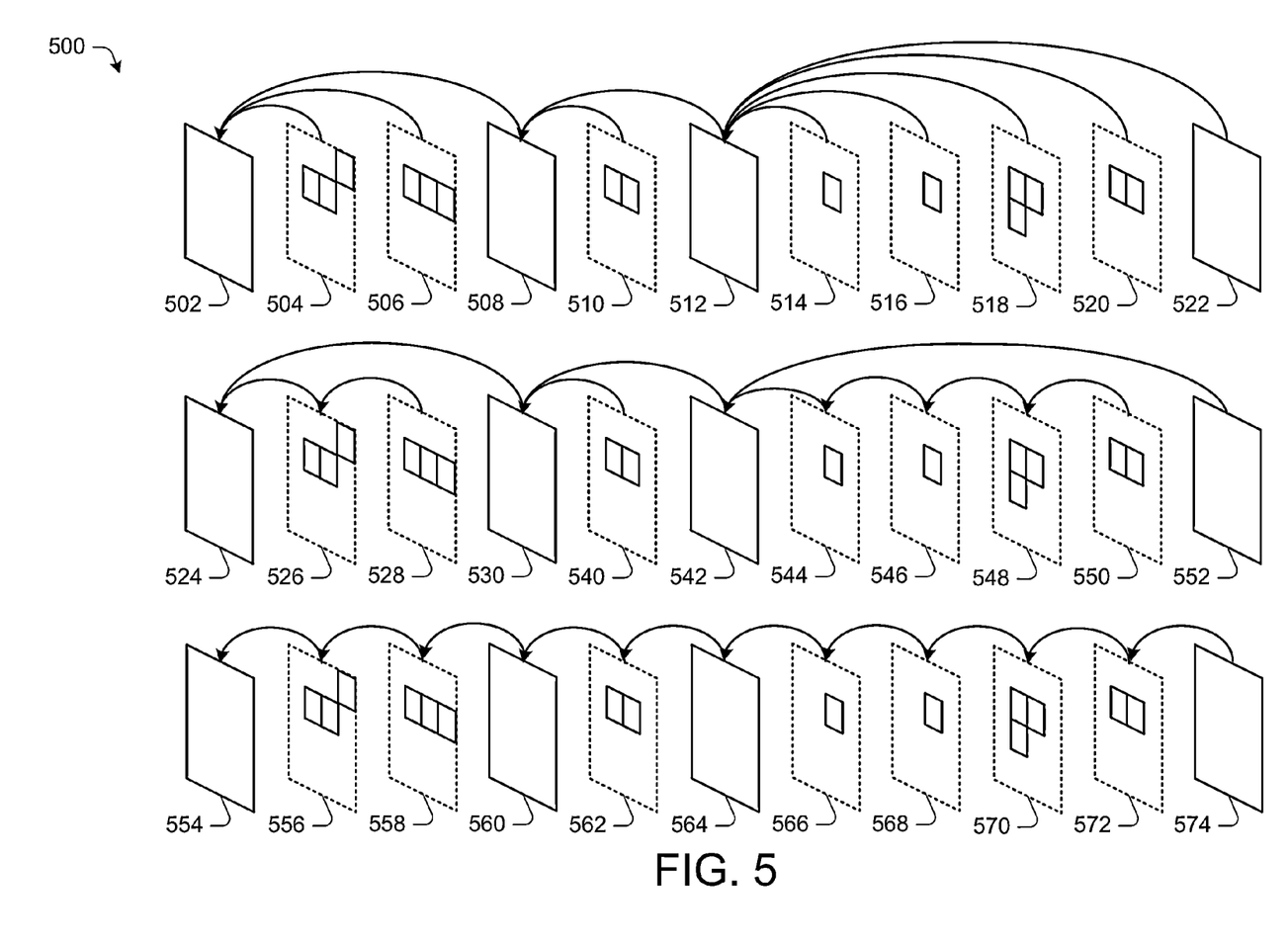
FIG. 5 illustrates different example sequences of video frames, including references between video frames, in accordance with some implementations.

FIG. 5 illustrates a framework 500 depicting the same sets of video frames and different ways of specifying a second layer encoding to reference a base layer encoding for regenerating a full video frame. In other words, different temporal reference structures are depicted according to illustrated reference lines, as discussed below. As noted above in regard to FIG. 4, a second layer encoding may reference a base layer encoding or instead reference another, distinct, second layer encoding in order to generate a full video frame that includes the region or regions of the second layer encoding.

The choice of which temporal reference structure to use may be based on expected or detected network conditions. Further, in some cases, network condition changes may be detected during a transmission of a video stream, and in response, the layered encoding component and layered decoding component may switch to a different, more suitable, temporal reference structure.

As depicted in FIG. 5, the shaded video frames, video frames 502, 508, 512, 522, 524, 530, 542, 552, 554, 560, 564 and 574 are the video frames encoded with a base layer encoding, which may encode all regions of the video frame, and the remaining video frames, video frames 504, 506, 510, 514, 516, 518, 520, 526, 528, 540, 544, 546, 548, 550, 556, 558, 562, 566, 568, 570 and 572 are the second layer encoded video frames.

In some implementations, if the network is unstable, long-term reference may be applied, such as the temporal reference structure depicted in video frames 502-522. In an unstable network environment, the long-term temporal reference structure may only use base layer encoded video frames as references in reconstructing a second layer encoded video frame. For example, base layer encoded video frame 502 may serve as a basis for reconstructing second layer encoded video frames 504 and 506. Similarly, base layer encoded video frame 508 may serve as a basis for reconstructing second layer encoded video frame 510; base layer encoded video frame 512 may serve as a basis for reconstructing second layer encoded video frames 514, 516, 518 and 520. In short, any second layer encoded video frames may be reconstructed independent of any other second layer encoded video frame because no second layer encoded video frame references, or is dependent upon, another second layer encoded video frame. In this example, long-term temporal reference structure, the overall coding bitrate may be increased due to more duplicate contents being encoded after cross frame reference checking.

Under more stable network conditions, the temporal reference structure of the set of video frames 524-552 may be used. In this example temporal reference structure, each base layer encoded video frame references, or is dependent upon, a prior base layer encoded video frame, and where each second layer encoded video frame references, or is dependent upon, a prior encoded video frame—whether the prior encoded video frame is base layer encoded or second layer encoded. For example, base layer encoded video frame 524 may serve as a basis for reconstructing second layer video frame 526; second layer encoded video frame 526 may serve as a basis for reconstructing second layer encoded video frame 528; base layer encoded video frame 524 may serve as a basis for reconstructing base layer encoded video frame 530; base layer encoded video frame 530 may serve as a basis for reconstructing second layer encoded video frame 540; base layer encoded video frame 530 may serve as a basis for reconstructing base layer encoded video frame 542; base layer encoded video frame 542 may serve as a basis for reconstructing second layer encoded video frame 544; second layer encoded video frame 544 may serve as a basis for reconstructing second layer encoded video frame 546; second layer encoded video frame 546 may serve as a basis for reconstructing second layer encoded video frame 548; second layer encoded video frame 548 may serve as a basis for reconstructing second layer encoded video frame 550; and base layer encoded video frame 542 may serve as a basis for reconstructing base layer encoded video frame 552. In this example, temporal reference structure, as compared with the long-term temporal reference structure, may be more efficient with respect to a compression ratio. However, any transmission losses of encoded video frames may lead to distortions in the reconstructed video stream for the second layer encoded video frames.

In still another implementation, a combination of the temporal reference structures described with respect to video frames 502-522 and 524-552 may be used. In such an implementation, each base layer encoded video frame would still reference, or depend upon, a prior base layer encoded video frame, however, each second layer encoded video frame would reference, or depend upon, either a previously encoded second layer video frame or a previously encoded base layer video frame. In this implementation, in the case that there are more than one second layer encoded video frames between base layer encoded video frames, the metadata within each second layer encoded video frame would specify two previously encoded video frames, (1) a previously encoded base layer video frame, and (2) a previously encoded second layer video frame. In this way, the layered decoding component would select, for a second layer encoded video frame, one of the two referenced, previously encoded video frames, where the loss of any one of the two referenced previously encoded video frames may be tolerated without any interruption in reconstructing the video stream.

Similarly, under stable network conditions, a temporal reference structure of the set of video frames 554-542 may be used. In this example temporal reference structure, each video frame, regardless of the encoding of the given video frame, references, or is dependent upon, a previous video frame. For example, base layer encoded video frame 554 may serve as a basis for reconstructing second layer encoded video frame 556; second layer encoded video frame 556 may serve as a basis for reconstructing second layer encoded video frame 558; second layer encoded video frame 558 may serve as a basis for reconstructing base layer encoded video frame 560; base layer encoded video frame 560 may serve as a basis for reconstructing second layer encoded video frame 562; second layer encoded video frame 562 may serve as a basis for reconstructing base layer encoded video frame 564; base layer encoded video frame 564 may serve as a basis for reconstructing second layer encoded video frame 566; second layer encoded video frame 566 may serve as a basis for reconstructing second layer encoded video frame 568; second layer encoded video frame 568 may serve as a basis for reconstructing second layer encoded video frame 570; second layer encoded video frame 570 may serve as a basis for reconstructing second layer encoded video frame 572; and second layer encoded video frame 572 may serve as a basis for reconstructing base layer encoded video frame 574.

Figure 6:
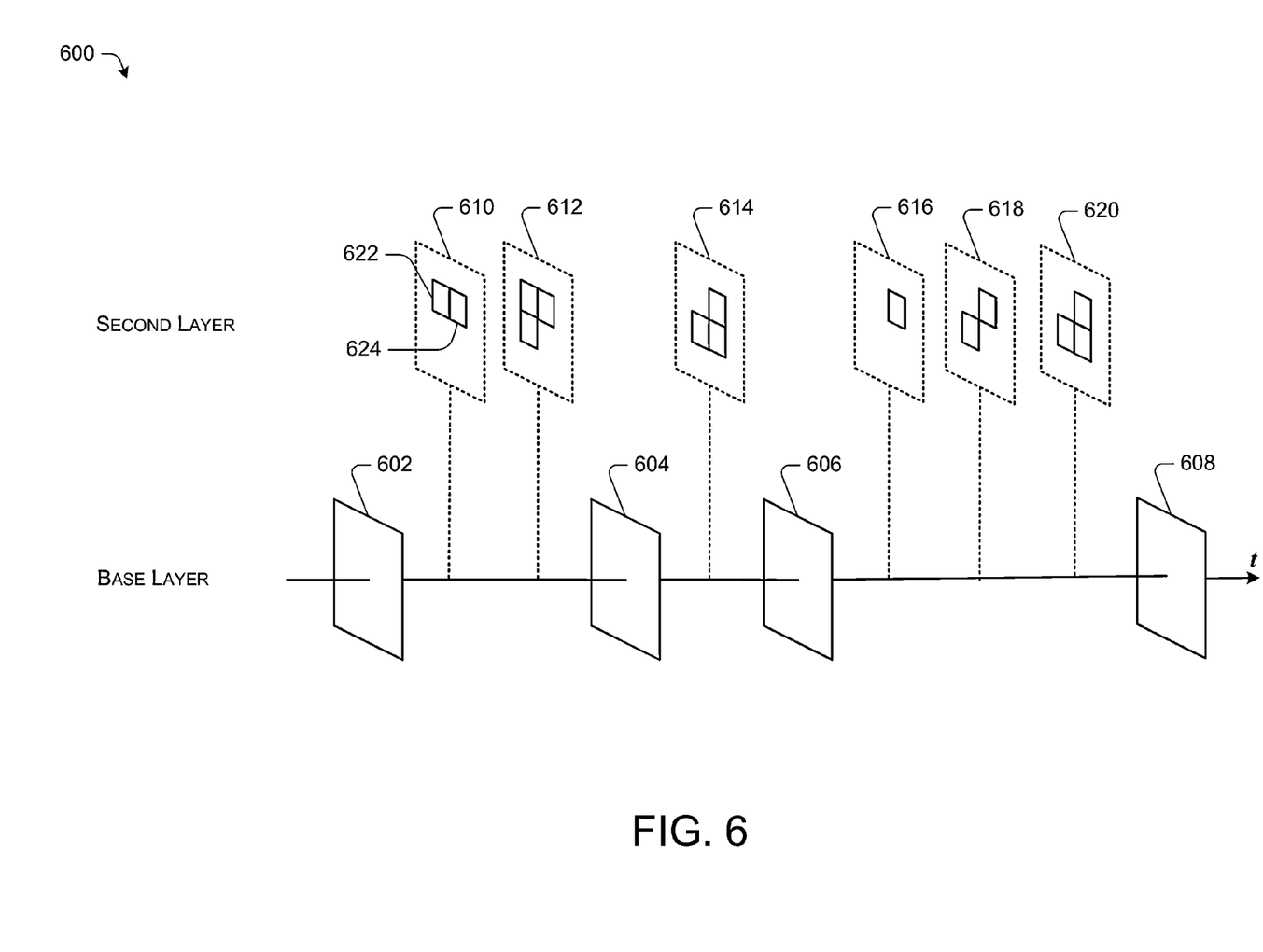
FIG. 6 illustrates elements included within different layers of video frames in accordance with some implementations described herein.

FIG. 6 illustrates a framework 600 depicting a decomposition of video frames into different layers of video frames, a base layer and a second layer. In this example, base layer video frames are video frames 602, 604, 606 and 608, and second layer video frames are video frames 610, 612, 614, 616, 618 and 620. Further, the second layer further depicts content selected, or regions selected, to be included within a given video frame encoding. In some implementations, upon a comparison between video frames, the layered encoding component may determine that video frames with small changes may be determined to be encoded at a second layer, where the small changes are specified within regions to be encoded.

In some implementations, a position of a region within a second layer encoded video frame, such as regions 622 and 624 of second layer video frame 610, may be represented with a binary skip map and losslessly compressed. However, other methods of identifying regions of blocks, including dimensions and locations, of blocks may be used. Further, given the analysis for identifying which regions or blocks are to be included within a second layer encoding, several different types of encodings may be used to generate the second layer encoding.

In some implementations, each of the regions determined to be included within a second layer video frame encoding may be encoded with a traditional video codec, such as H.264, MPEG-2, or some other standard video codec. In this way, dependent upon the video content, a coding scheme optimized for high-contrast regions and smooth backgrounds may be used, such as may be the case when user interfaces are streamed. In such a case, the layered encoding component may determine that the video contents include a shared desktop, or a user interface, and determine that an encoding technique optimized for high-contrast regions and smooth backgrounds be used. As noted above, in some cases an encoding technique such as pixel-domain coding may be used. Otherwise, the layered encoding component may determine that a standard transform-based coding technique is more suitable to be used to encode the second layer video frames.

In some implementations, multiple different types of encoding techniques may be used in generating a single second layer encoded video frame, where the particular type of encoding technique may be based partly on image characteristics of the contents of a given region to be encoded. For example, high-contrast regions, in addition to high-contrast regions with smooth backgrounds, may be encoded with a pixel-domain coding technique, while other regions within the same video frame may be encoded with conventional transform-based coding techniques.

Further, in regard to determining whether a given region is a high-contrast region when using multiple encoding techniques for a single video frame, the layered encoding component may base a determination on luminance histograms. For example, for video contents with high contrasts, the luminance distribution would be sparser. Further, based on the distribution property or properties, a quantization may be performed for each given region, or block, within a video frame, where peak histogram values may be selected as base colors. In this way, an equal sized window in the histogram may be used to range colors near major colors, and the pixels may be quantized to the base color. Based on these determinations, the layered encoding component may use a pixel-domain coding technique. Otherwise, if the pixel color characteristics fall outside the range of the determined windows of the histogram, the region or block of the second layer encoding may be encoded using a transform-based coding technique.

Figure 7:
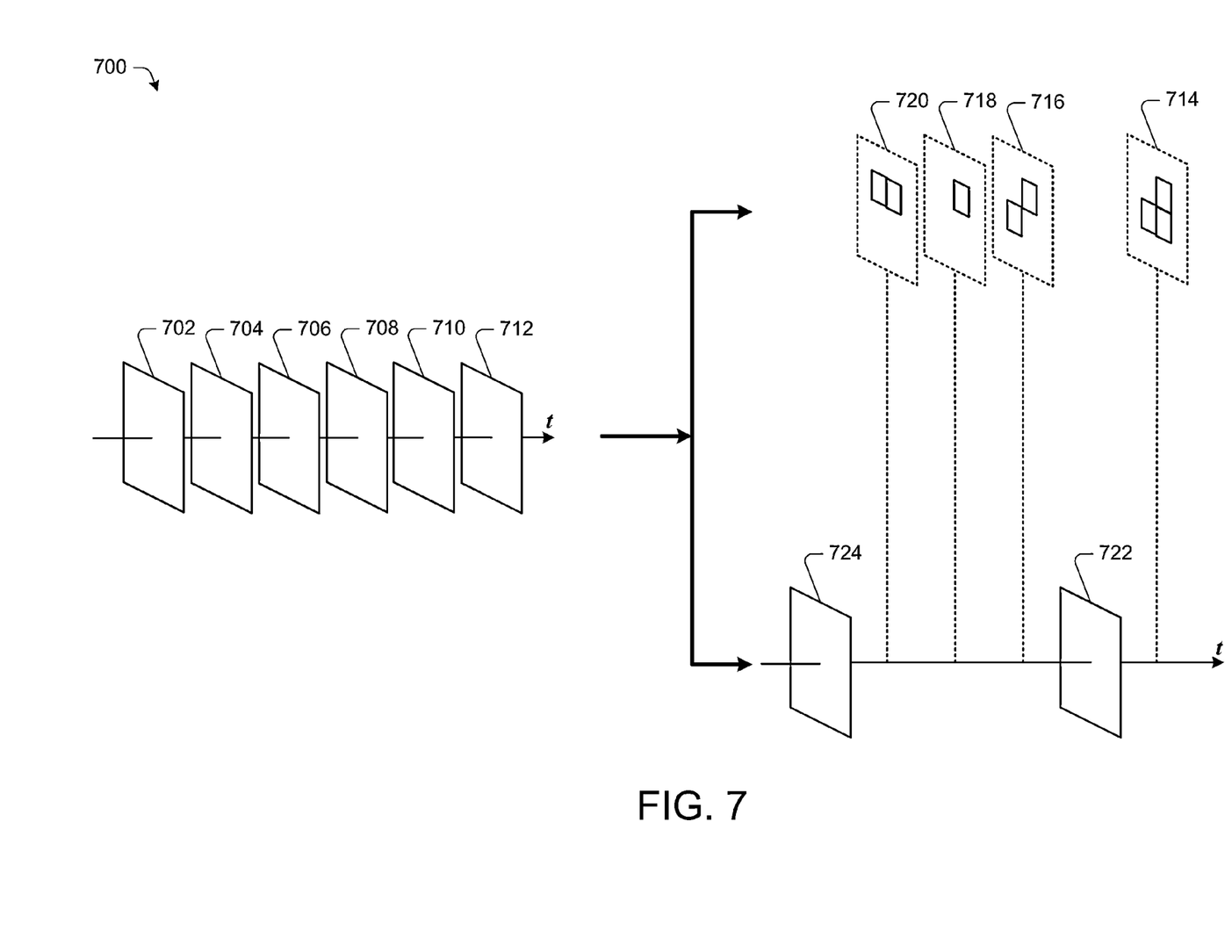
FIG. 7 illustrates a division of a sequence of video frames into multiple layers of encoded video frames in accordance with some implementations.

FIG. 7 illustrates a framework 700 depicting a series of video frames as they exist prior to analysis and separation into multiple encoded layers so that the series of video frames may be encoded and transmitted to a target device. For example, video frames 702-712 may be generated through user interface updates or through a natural video recording. More generally, the layered encoding component may analyze any series of packets of data, where the characteristics of the data are such that there is a large amount of similarity between consecutive data packets.

In this implementation, the source device may be device 102, and video frames 702-712 may be video frames received at a content analysis module of a layered encoding component, such as content analysis module 106 of layered encoding component 104 depicted in FIG. 1. Further, the content analysis module may determine whether a given video frame is suitable for base layer encoding or second layer encoding, where the base layer encoding may be performed by a base layer encoding module such as base layer encoding module 110, and where the second layer encoding may be performed by a second layer encoding module such as second layer encoding module 108.

In response to an analysis of the contents of a video frame, for example, as described above in regard to FIG. 2, the content analysis module may determine that a given frame is suitable for a base layer encoding or a second layer encoding. In this example, original video frames 712, 708, 706, and 704 are analyzed by the content analysis module and determined to be second layer encoded, and the second layer encoding module may then generate second layer encoded video frames 714, 716, 718 and 720. Further in this example, second layer encoded video frame 720 corresponds to and is based at least in part on original video frame 712; second layer encoded video frame 716 corresponds to and is based at least in part on original video frame 708; second layer encoded video frame 718 corresponds to and is based at least in part on original video frame 706; and second layer encoded video frame 720 corresponds to and is based at least in part on original video frame 704.

Further, in this implementation, the content analysis module also determines, based at least partly on an analysis of the video frame contents, that original video frames 710 and 702 are suitable for a base layer encoding. In this example, base layer encoded video frame 722 corresponds to and is based at least in part on original video frame 710, and base layer encoded video frame 724 corresponds to and is based at least in part on original video frame 702.

After the original video frames are analyzed and encoded into base layer encoded video frames and second layer video frames, the layered encoding component may transmit the encoded frames to a target device.

Figure 8:
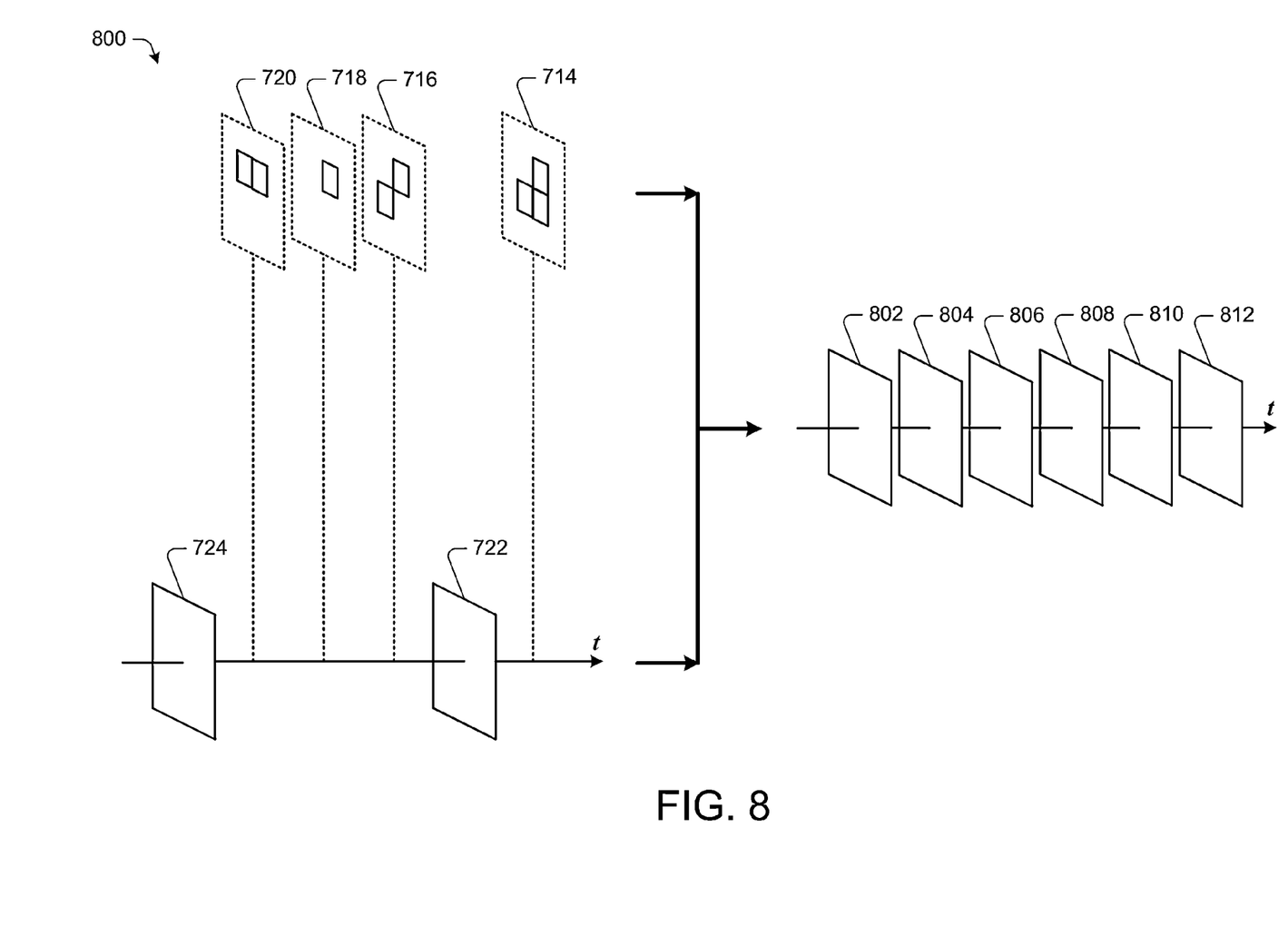
FIG. 8 illustrates a merging of different layers of video frames into a reconstructed video stream in accordance with some implementations.

FIG. 8 illustrates a framework 800 depicting receiving a series of encoded video frames from a source device, where the receiving device, or target device, may analyze the encoded series of video frames with a layered decoding component and generate a reconstructed series of video frames. For example, the receiving device, or target device, may be device 114, as depicted in FIG. 1, and the received encoded video frames 714-724 may be received at a layered decoding component, such as layered decoding component 116, and analyzed with a layer merging module such as layer merging module 122 to determine how to decode the encoded video frames. Further, based on the determination by the layer merging module, an encoded video frame may be decoded with a base layer decoding module such as base layer decoding module 120, or an encoded video frame may be decoded with a second layer decoding module such as second layer decoding module 118.

In this example, the layer merging module may determine that encoded video frames 714, 716, 718 and 720 have been encoded with a second layer encoding and decode these encoded video frames with a second layer decoding technique or techniques to generate reconstructed video frames. For example, as discussed above in regard to FIG. 5, a video frame may be second layer encoded using one or more different encoding techniques. Similarly, the layer merging module may determine that encoded video frames 722 and 724 have been encoded with a base layer encoding and decode these encoded video frames with a base layer decoding technique to generate reconstructed video frames.

Further in this example, the layer merging module, after the encoded video frames have been decoded, may determine the respective order of the decoded video frames, and based on the respective order, generate a series of reconstructed video frames, as depicted with reconstructed video frames 802-812. In this example, reconstructed video frame 802 corresponds to original video frame 702; reconstructed video frame 804 corresponds to original video frame 704; reconstructed video frame 806 corresponds to original video frame 706; reconstructed video frame 808 corresponds to original video frame 708; reconstructed video frame 810 corresponds to original video frame 710; and reconstructed video frame 812 corresponds to original video frame 712.

In this way, in this example, the reconstructed video frames on the target device may display the streaming video transmitted from the source device.

Illustrative Computer System

Figure 9:
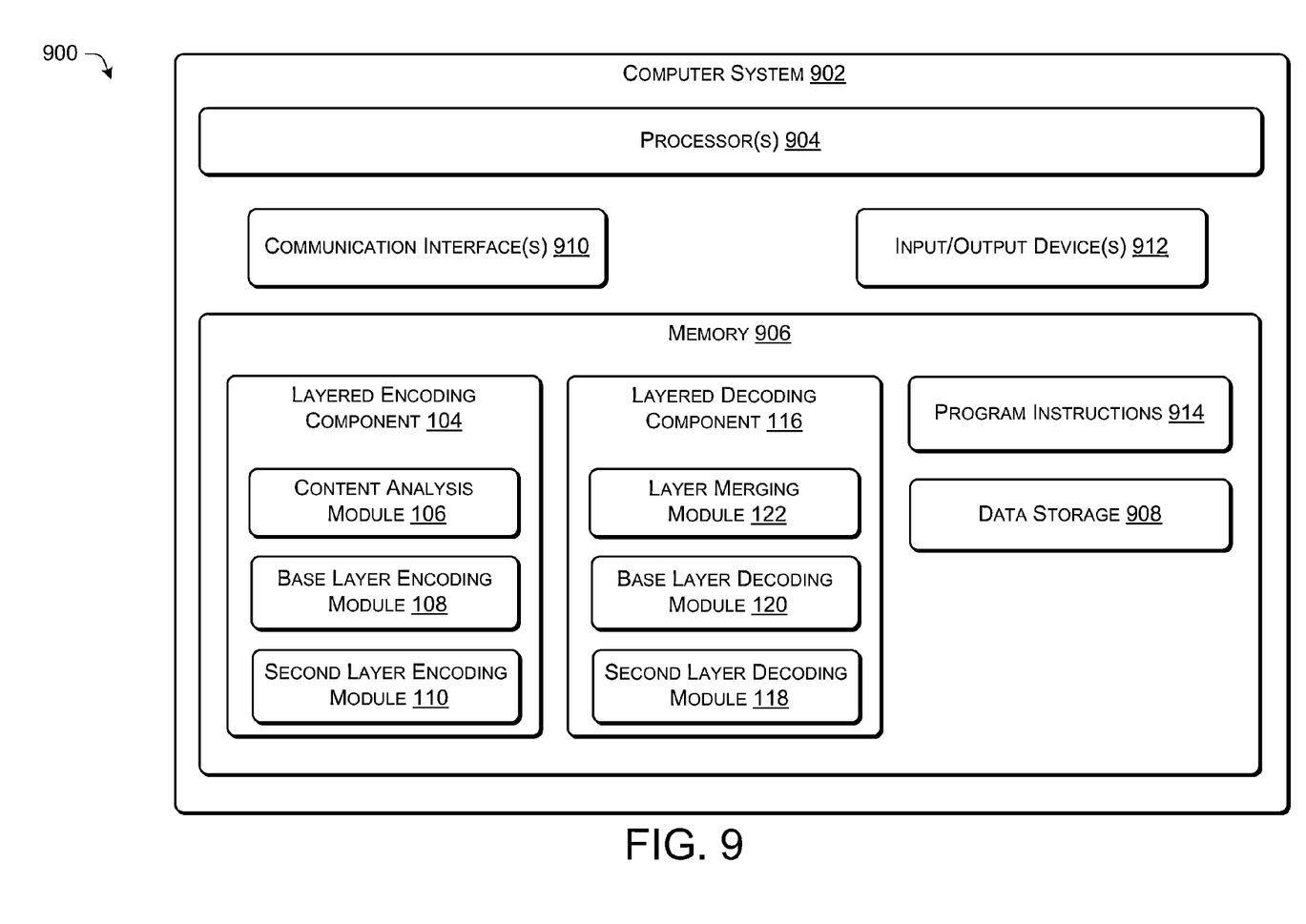
FIG. 9 illustrates a computer system that may be configured to implement a layered encoding component and layered decoding component according to some implementations.

FIG. 9 further illustrates a framework 700 depicting a computer system 902. Computer system 902 may be implemented in different devices, such as device 102 and device 114 depicted in FIG. 1. Generally, computer system 902 may be implemented in any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in any type of computing or electronic device.

In one implementation, computer system 902 includes one or more processors 904 coupled to memory 906. The processor(s) 904 can be a single processing unit or a number of processing units, all of which can include single or multiple computing units or multiple cores. The processor(s) 904 can be implemented as one or more microprocessors, microcomputers, microcontrollers, digital signal processors, central processing units, state machines, logic circuitries, and/or any devices that manipulate signals based on operational instructions. As one non-limiting example, the processor(s) 904 may be one or more hardware processors and/or logic circuits of any suitable type specifically programmed or configured to execute the algorithms and processes described herein. Among other capabilities, the processor(s) 904 can be configured to fetch and execute computer-readable instructions stored in the memory 906 or other computer-readable media. Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

By contrast, communication media may embody computer-readable instructions, data structures, program modules, or other data in a modulated data signal, such as a carrier wave, or other transmission mechanism. As defined herein, computer storage media does not include communication media.

The memory 906, including data storage 908, is an example of computer storage media. Further, computer system 902 may include one or more communication interfaces 910 that may facilitate communications between computing devices. In particular, the communication interfaces 910 may include one or more wired network communication interfaces, one or more wireless communication interfaces, or both, to facilitate communication via one or more networks represented by a network, such as network 112. The network 112 may be representative of any one or combination of multiple different types of wired and wireless networks, such as the Internet, cable networks, satellite networks, wide area wireless communication networks, wired local area networks, wireless local area networks, public switched telephone networks (PSTN), and the like.

Additionally, computer system 902 may include input/output devices 912. The input/output devices 912 may include a keyboard, a pointer device, (e.g. a mouse or a stylus), a touch screen, one or more image capture devices (e.g. one or more cameras), one or more microphones, a display, speakers, and so forth.

In some implementations, the invention may be implemented using a single instance of a computer system, while in other implementations, the invention may be implemented on multiple such systems, or multiple nodes making up a computer system may be configured to host different portions or instances of implementations. For example, in one implementation some elements may be implemented via one or more nodes of the computer system that are distinct from those nodes implementing other elements.

The memory 906 within the computer system 902 may include program instructions 914 configured to implement each of the implementations described herein. In one implementation, the program instructions may include software elements of implementations of the modules discussed herein. The data storage within the computer system may include data that may be used in other implementations.

Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
one or more computing nodes, each comprising at least one processor and memory, wherein the memory includes computer storage media storing computer readable instructions that when executed by the at least one processor perform operations comprising:
generating a first encoding of a first frame of a video stream according to a first layer encoding, wherein the first frame references a second frame previous to the first frame in the video stream and the second frame is encoded according to the first layer encoding;
determining that an amount of change between one or more regions of a third frame of a video stream corresponding with one or more regions of a fourth frame previous to the third frame in the video stream is greater than a threshold amount of change;
determining, based at least partly on the amount of change, that the one or more regions of the third frame are suitable for a second layer encoding;
generating a second encoding of the third frame according to the second layer encoding, wherein the third frame references the fourth frame and the fourth frame is encoded according to the second layer encoding;
detecting, after generating the first encoding and the second encoding, changes to network conditions during transmission of additional frames of the video stream;
generating, based at least partly on the changes to the network conditions, a first additional encoding for a first additional frame encoded according to the first layer encoding and referencing a second additional frame previous to the first additional frame in the video stream with the second additional frame being encoded according to the first layer encoding; and
generating, based at least partly on the changes to the network conditions, a second additional encoding for a third additional frame encoded according to the second layer encoding and referencing the second additional frame, wherein the third additional frame is subsequent to the first additional frame and the second additional frame in the video stream.

2. The system as recited in claim 1, wherein remaining regions of the third frame other than the one or more regions of the third frame are not encoded according to the first encoding or the second encoding.

3. The system as recited in claim 1, wherein a first region of the third frame is encoded with a pixel-domain coding technique and a second region of the third frame is encoded with a transform-based coding technique.

4. The system as recited in claim 1, wherein the operations further comprise:
generating a reconstructed frame of a fifth frame of an additional video stream, the fifth frame including one or more regions encoded according to the first layer encoding and one or more additional regions encoded according to the second layer encoding.

5. A method comprising:
under control of one or more computing devices configured with executable instructions:
generating a first encoding of a first frame of a video stream according to a first layer encoding, wherein the first frame references a second frame previous to the first frame in the video stream and encoded according to the first layer encoding;
determining that one or more regions of a third frame are suitable for a second layer encoding;
generating a second encoding of the one or more regions of the third frame according to the second layer encoding, wherein the third frame references a fourth frame previous to the third frame in the video stream and encoded according to the second layer encoding;
detecting changes to conditions of a network during transmission of additional frames of the video stream;
generating, based at least partly on the changes to the network conditions, a first additional encoding of a first additional frame encoded according to the first layer encoding, wherein the first additional frame references a second additional frame previous to the first additional frame in the video stream and encoded according to the first layer encoding; and
generating, based at least partly on the changes to the network conditions, a second additional encoding of a third additional frame encoded according to the second layer encoding, wherein the third additional frame references the second additional frame.

6. The method as recited in claim 5, wherein detecting changes to the conditions of the network includes determining that the network is unstable.

7. The method as recited in claim 5, wherein the first encoding and the second encoding are generated based at least partly on expected conditions of the network before the first encoding and the second encoding are generated.

8. The method as recited in claim 5, further comprising transmitting the first encoding separately from the second encoding.

9. The method as recited in claim 5, further comprising transmitting the first encoding and the second encoding in an arbitrary order, wherein the first encoding includes first metadata specifying a position of the first frame within the video stream, and wherein the second encoding includes second metadata specifying a position of the third frame within the video stream.

10. The method as recited in claim 5, wherein generating the first encoding and generating the second encoding are performed in parallel.

11. The method as recited in claim 5, wherein generating the second encoding comprises generating metadata specifying a size and location for each of the one or more regions of the third frame.

12. The method as recited in claim 11, wherein the metadata further specifies one or more encoding techniques used in generating the second encoding.

13. The method as recited in claim 12, wherein the metadata further specifies that the fourth frame is a reference video frame upon which to at least partly base a reconstruction of the third frame.

14. The method as recited in claim 13, further comprising:
detecting additional changes to the conditions of the network during transmission of the additional frames of the video stream; and
determining that the network is stable based at least partly on the additional changes to the conditions of the network.

15. The method as recited in claim 5, further comprising determining that an amount of change between the one or more regions of the third frame and one or more additional regions of the fourth frame is at least in part based on a luminance histogram of characteristics of image values of the third frame.

16. The method as recited in claim 15, wherein determining that the one or more regions of the third frame are suitable for the second layer encoding is at least in part based on a sparsity of a distribution of the luminance histogram.

17. A method comprising:
performing, by one or more computing devices:
receiving a first frame of a video stream, wherein the first frame is encoded with a first encoding technique;
decoding the first frame to generate a reconstructed first frame based at least partly on a second frame previous to the first frame in the video stream, wherein the second frame is encoded with the first encoding technique;
receiving a third frame of the video stream;
determining that a portion of regions of the third frame are encoded with a second encoding technique different from the first encoding technique;
decoding the portion of the regions of the third frame to generate a reconstructed third frame based at least partly on a fourth frame previous to the third frame in the video stream, wherein the fourth frame is encoded with the second encoding technique;
detecting changes to network conditions during transmission of additional frames of the video stream;
decoding, based at least partly on the changes to the network conditions, a first additional frame encoded according to the first layer encoding based at least partly on a second additional frame previous to the first additional frame, wherein the second additional frame is encoded according to the first layer encoding; and
decoding, based at least partly on the changes to the network conditions, a third additional frame encoded according to the second layer encoding based at least partly on the second additional frame, wherein the second additional frame is previous to the third additional frame in the video stream.

18. The method as recited in claim 17, wherein generating the reconstructed first frame comprises:
extracting metadata specifying a size and location for each of one or more regions of the first frame, wherein the metadata further specifies that the second frame is a reference video frame; and generating, at least in part, the reconstructed first frame from the one or more regions combined with one or more additional regions from the reference video frame.

19. The method as recited in claim 17, wherein:

decoding the portion of the regions of the third frame produces a decoded portion of the third frame; and generating the reconstructed third frame includes combining copies of remaining regions of the third frame that are not encoded with the decoded portion of the third frame.

20. The method as recited in claim 17, wherein decoding the first frame further comprises:

extracting metadata specifying an encoding technique used to encode the first frame; and decoding the first frame according to the encoding technique.

* * * * *